(12) United States Patent
Kurokawa et al.

(10) Patent No.: US 7,245,570 B2
(45) Date of Patent: Jul. 17, 2007

(54) INFORMATION RECORDING METHOD AND INFORMATION RECORDING APPARATUS

(75) Inventors: Takahiro Kurokawa, Fujisawa (JP); Harukazu Miyamoto, Higashimurayama (JP)

(73) Assignee: Hitachi, Ltd., Tokyo (JP)

( * ) Notice: Subject to any disclaimer, the term of this patent is extended or adjusted under 35 U.S.C. 154(b) by 626 days.

(21) Appl. No.: 10/773,438

(22) Filed: Feb. 9, 2004

(65) Prior Publication Data
US 2005/0088953 A1 Apr. 28, 2005

(30) Foreign Application Priority Data
Oct. 28, 2003 (JP) ............... 2003-367782

(51) Int. Cl.
*G11B 5/09* (2006.01)
*G11B 7/00* (2006.01)

(52) U.S. Cl. ............ 369/47.5; 369/47.53; 369/112.01; 369/44.41

(58) Field of Classification Search ............ None
See application file for complete search history.

(56) References Cited

U.S. PATENT DOCUMENTS

2002/0085462 A1* 7/2002 Spruit ............ 369/47.53
2002/0136122 A1* 9/2002 Nakano ............ 369/47.53

FOREIGN PATENT DOCUMENTS

| JP | 11-273073 | 3/1998 |
| JP | 2001-148133 | 11/1999 |
| JP | 2002-279634 | 3/2001 |
| JP | 2002-298358 | 4/2001 |
| JP | 2003-22532 A | 7/2001 |
| JP | 2003-109217 | 9/2001 |

OTHER PUBLICATIONS

Japanese Office Action, Dated May 9, 2006,.2 Total Pages.
Office Action from the Japanese Patent Office dated Feb. 14, 2006 (in Japanese).

* cited by examiner

*Primary Examiner*—Muhammad Edun
(74) *Attorney, Agent, or Firm*—Reed Smith LLP; Stanley P. Fisher, Esq.; Juan Carlos A. Marquez, Esq.

(57) ABSTRACT

In an optical recording medium having two information recording layers, a highly reliable recording can be conducted in one of the recording layers in the back regardless of the recording state of the other recording layer closer to the side of the disc on which light is incident. A first photodetector 115 detects reflected light from a recording layer 103 in the back when the light is focused thereon. A second photodetector 116 is disposed outside the periphery of the first photodetector 115 and detects reflected light from a recording layer 105 located in front. When recording in the recording layer in the back, the write power is controlled in accordance with the output level of the second photodetector.

12 Claims, 10 Drawing Sheets

PRIOR ART

REGION A
REGION B
REGION C
601
USER DATA AREA
L1 LAYER

FIG. 13

| OUTPUT LEVEL OF THE SECOND DETECTOR (ARBITRARY UNIT) | 100 | 105 | 110 | 115 | 120 | 125 | 130 | 135 |
|---|---|---|---|---|---|---|---|---|
| WRITE POWER $P_{LO}$ (mW) | 7.3 | 7.2 | 7.1 | 7.0 | 6.9 | 6.8 | 6.7 | 6.6 |

INFORMATION RECORDING METHOD AND INFORMATION RECORDING APPARATUS

BACKGROUND OF THE INVENTION

1. Field of the Invention

The present invention relates to an information recording method and apparatus for optical recording media having two information recording layers whose states can be varied by optical irradiation.

2. Background Art

The capacity of visual content recording media, such as optical discs represented by DVDs, is increasing, and an optical disc is being developed that is capable of recording over two hours of high-definition television (HDTV) pictures on a 120 mm-diameter disc. An optical disc format called Blu-ray Disc has lately been established which realizes a recording capacity of approximately 25 GB on one side of the disc by increasing its recording capacity by as much as about five times that of a DVD by employing a semiconductor laser of 405 nm wavelength and an objective lens with a numerical aperture of 0.85. A video recorder adapted for that format has also been put on the market. The Blu-ray Disc specifications are described in "System Description Blu-ray Disc Rewritable Format Part 1: Basic Format Specifications Version 1.0."

The capacity of optical discs can be increased by increasing their recording density, for example. However, reductions in optical spot size are nearing a limit due to limitations in laser wavelength and the objective lens, and there is little prospect for significant improvements in recording density.

In another method of achieving greater capacity apart from the improvement in recording density, the recording layer is divided into multiple layers. A multilayer optical disc has already been put on the market in the form of read-only optical discs or DVD-ROM discs that have two layers on either one side or both sides (for a total of four layers). There has been no recordable multilayer optical disc as a product so far but specifications for a double-layer rewritable disc in accordance with the Blu-ray Disc format have recently been established for the first time.

Figure 2:
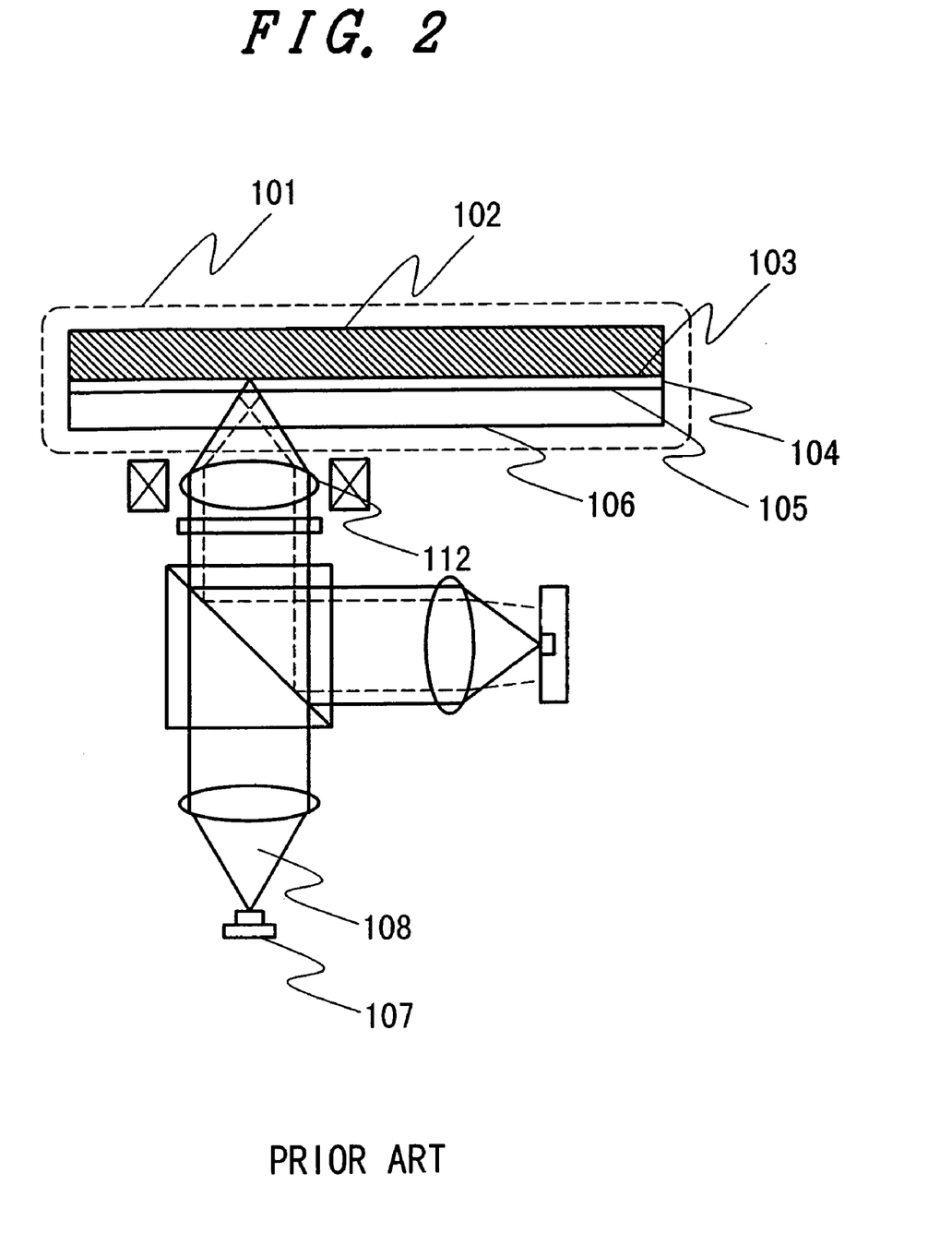
FIG. 2 shows the configuration of a conventional double-layer optical disc system.

FIG. 2 shows the setup of a double-layer recordable optical disc system according to the conventional Blu-ray Disc format. A double-layer disc medium 101 is irradiated with laser light 108 emitted by a laser diode 107 to write or read information. The laser light has the wavelength 405 nm and is focused on a recording layer by an objective lens 112 with numerical aperture (NA) of 0.85, thus forming an optical spot of a diameter of about 400 nm, with which information is written or read. During the writing of information, a high-power laser light is shone in order to cause a physical change in the recording layer material, such that long and short recording marks are formed. A minimum recording mark length is 160 nm, and approximately 23.3 GB of information per recording layer, or approximately 46.6 GB of information can be recorded on a single double-layer optical disc.

The double-layer optical disc medium 101 is a disc with a diameter of 120 mm and a thickness of 1.2 mm and is made up of a substrate 102, a first recording layer (L0 layer) 103, a spacer layer 104, a second recording layer (L1 layer) 105 and a cover layer 106 sequentially stacked upon one another. The substrate 102 is a disc of thickness 1.1 mm and is made of polycarbonate resin or other material. On the surface of the substrate is formed a spiral guide groove (track) with a 0.32 μm pitch for allowing the optical spot to trace at a certain radial position (tracking). The recording marks are formed within the guide groove. The first recording layer (L0 layer) 103 is formed next to the substrate. The recording layer is normally made of a recording film disposed between protective layers, with the recording film being made of a phase-change material, such as a GeSbTe alloy or an AgInSbTe alloy. Regardless of whichever recording film material is used, binary data is recorded by assigning its "0's" and "1's" to a high-reflectance crystal portion and a low-reflectance amorphous portion, respectively, and the data is played back by identifying the "0's" and "1's" of the binary data based on their difference in reflectance. Next to the L0 layer 103 is formed the second recording layer (L1 layer) 105 via the spacer layer 104, which is formed to separate the first recording layer 103 and the second recording layer 105. The spacer layer 104 has a thickness of about 25 μm and is made of a UV curable resin. The structure of the L1 layer 105 is substantially identical to that of the L0 Layer 103. Finally, the cover layer 106, which has a thickness of 75 μm and is made of a UV curable resin, is formed to provide protection for the surface of the disc.

In the double-layer optical disc, however, during recording in the L0 Layer, which is located farther from the side on which the light is incident, different levels of laser power are delivered to the L0 Layer through a recorded region and an unrecorded region on the L1 layer, which is located before the L0 Layer, due to the effective difference in transmittance of the L1 layer.

To solve this problem, JP Patent Publication (Kokai) No. 2003-109217 (Patent Document 1) discloses the difference in transmittance between the unrecorded and recorded portions in the L1 layer is limited, such that the L0 Layer can be recorded with a certain write power regardless of the state of recording on the L1 layer. Another method is disclosed in JP Patent Publication (Kokai) No. 2002-279634 (Patent Document 2) whereby the write power directed to the L0 layer is controlled in accordance with the level of a read RF signal from the L0 layer.

Patent Document 1: JP Patent Publication (Kokai) No. 2003-109217

Patent Document 2: JP Patent Publication (Kokai) No. 2002-279634

Non-Patent Document 1: System Description Blu-ray Disc Rewritable Format Part 1: Basic Format Specifications Version 1.0

SUMMARY OF THE INVENTION

Figure 3:
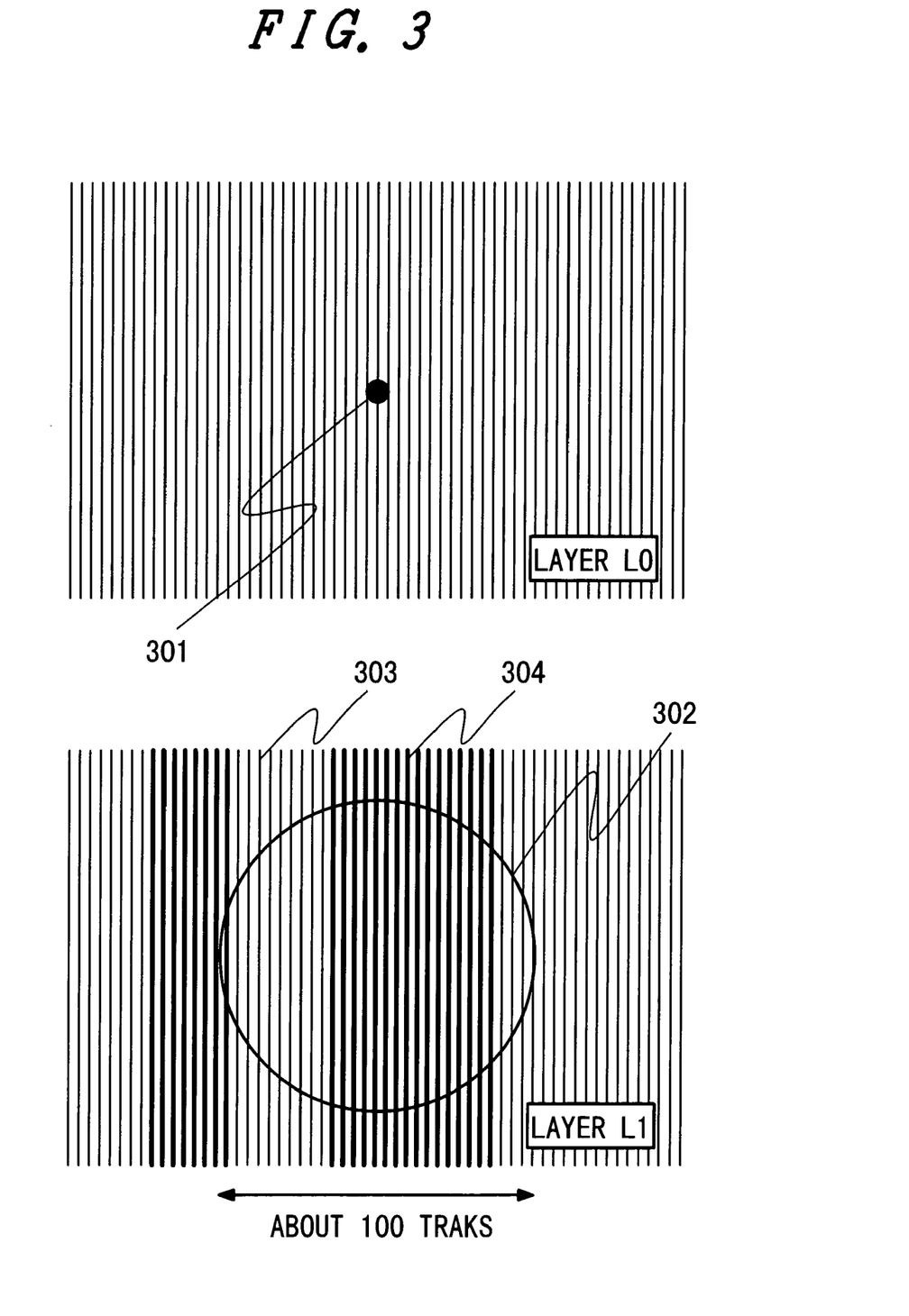
FIG. 3 shows optical spots on an L0 Layer and an L1 layer when laser light is focused on the L0 Layer.

During recording in the L0 Layer, the laser light passes through the L1 layer, which is nearer to the side on which the light is incident. Usually, an unrecorded region 303 and a recorded region 304 are located on the L1 layer in an arbitrary manner, as shown in FIG. 3. When designing the optical properties of the L1 layer, there should desirably be no variation in transmittance between the unrecorded and recorded regions. However, this is often difficult and there is sometimes a transmittance difference of the order of several to ten percent between the unrecorded region 303 and the recorded region 304.

When there is a transmittance difference of the order of several to ten percent between the unrecorded and recorded portions, the method disclosed in Patent Document 1 is hardly capable of recording with high reliability across the entire L0 Layer with a constant write power because of a reduced write power margin. On the other hand, the method according to Patent Document 2 is rendered incapable of determining the write power to be delivered to an unrecorded region for writing, because the method requires the use of a read RF signal from the L0 Layer in order to determine the write power directed to the L0 layer.

When there is a transmittance difference between the unrecorded region 303 and recorded region 304, the level of laser power delivered to the L0 Layer varies between when the L0 Layer is recorded through the unrecorded region 303 and through the recorded region 304 on the L1 layer due to the difference in effective transmittance in the L1 layer. More accurately speaking, the effective transmittance of the L1 layer when an optical spot 301 is focused on the L0 Layer does not vary in a binary manner depending on whether the L1 layer is recorded or unrecorded. Rather, the effective transmittance of the L1 layer varies in a continuous manner depending on the real ratio between the unrecorded and recorded portions occupying the optical spot 302 on the L1 layer.

Figure 4:
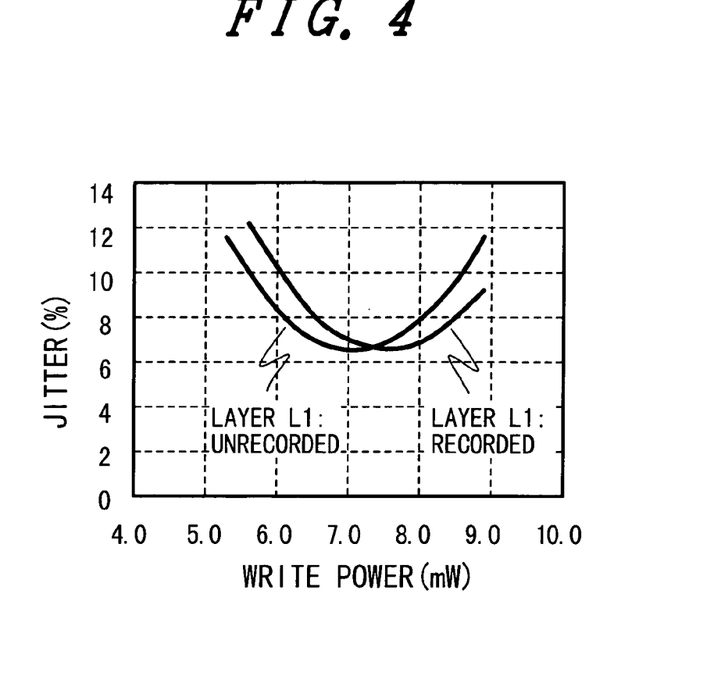
FIG. 4 shows the relationship between write power and jitter when the L0 layer is recorded.

An example of how this phenomenon influences the write learning will be described next. FIG. 4 shows the relationship between the write power and jitter during writing and reading of the L0 Layer in a double-layer recordable optical disc, individually for a case where the L1 layer had been unrecorded and another case where the layer had been recorded. In a waveform equalizing process before binarization of a read signal, a limit equalizer was used. Details of a limit equalizer are described, for example, in "S. Miyanabe et al.: Jpn. J. Appl. Phys. Vol. 38, pp. 1715."

In this measurement, when the entire region of the L1 layer had been unrecorded, the optimum write power, which is the write power at which the jitter is minimized, was 7.1 mW, with a 6.7% jitter. On the other hand, when the entire region of the L1 layer had been recorded, the optimum write power was 7.5 mW. Namely, the optimum write power in the case where the L1 layer had been recorded shifted to the higher-power end by about 7% as compared with the case where the L1 layer had been unrecorded. Thus, if the disc were to be written when the L1 layer is recorded using the optimum write power 7.1 mW for the unrecorded L1 layer, the jitter would be 7.0%, which is a 0.3% increase over that which would be obtained if the optimum write power for the recorded L1 layer were to be used.

This result indicates the following, for example. It is now assumed that, when conducting a write learning on the L0 Layer, a portion on the L1 layer through which laser light passes is unrecorded, and that the entire L0 Layer is recorded using an optimum write power that has been decided in the aforementioned state. Then, the L0 Layer can be recorded without any problem if the laser passed through the unrecorded portion on the L1 layer, but if the laser passed through a recorded portion, the jitter in a read signal of the data recorded in the L0 Layer increases. Thus, in the conventional double-layer optical disc system, it has been difficult to write data across the entire L0 Layer with high reliability.

It is the object of the present invention to provide an information recording method and apparatus for optical recording media having two information recording layers, whereby a recording layer in the back can be recorded with high reliability regardless of the recording state of a recording layer located towards the side on which light is incident.

In accordance with the invention, besides a first photodetector that is conventionally used for acquiring a data read signal and a servo signal, a second photodetector is provided for detecting the recording state of the L1 layer. When recording in the L0 Layer, the recording state of the L1 layer is detected by means of the second photodetector, and a write power adjusted for the detected recording state is used. Thus, a highly reliable recording can be conducted regardless of the recording state of the L1 layer.

The invention provides an information recording apparatus comprising: a recording medium having two information recording layers stacked one upon the other in which information is recorded as their states are varied upon light irradiation; a light source; an optical system for focusing light from said light source selectively on a first information recording layer located closer to the side on which the light is incident and on a second information recording layer farther from the side on which the light is incident; a first photodetector for detecting light reflected by either said first or said second information recording layer on which the light from said light source is focused; a second photodetector for detecting light reflected by said first information recording layer when the light from said light source is focused on said second information recording layer; and a control circuit for controlling the power of the light with which said second information recording layer is irradiated, based on a detection signal from said second photodetector. The second photodetector is disposed outside the periphery of the first photodetector. A relationship between the detection signal from the second photodetector and the power of light with which the second information recording layer is irradiated is drawn through a test write process and is then stored in the form of a table.

The invention also provides an information recording method for recording information in a recording medium having two information recording layers stacked one upon the other in which information is recorded as their states are varied upon light irradiation, said method comprising the steps of: acquiring, in a test writing operation, a first optimum power value for recording, through a recorded region in a first information recording layer located closer to the side on which light is incident, in a second information recording layer located farther from the side on which light is incident, and the intensity of a first reflected light from said first information recording layer at that time, and a second optimum power value for recording, through an unrecorded region in said first information recording layer located closer to the side on which light is incident, in said second information recording layer located farther from the side on which light is incident, and the intensity of a second reflected light from said first information recording layer at that time; detecting the intensity of reflected light from said first information recording layer when light is focused on said second information recording layer; and controlling the power of the light with which said second information recording layer is irradiated, based on a detection signal from the second photodetector.

In accordance with the invention, in a double-layer disc, the recording layer located farther from the side on which light is incident can be recorded with an optimum write power at all times regardless of the recording state of the recording layer closer to the side on which light is incident. Accordingly, the invention can provide a highly reliable double-layer optical disc.

DESCRIPTION OF THE PREFERRED EMBODIMENTS

An embodiment of the invention will be hereafter described by referring to the drawings.

Figure 1:
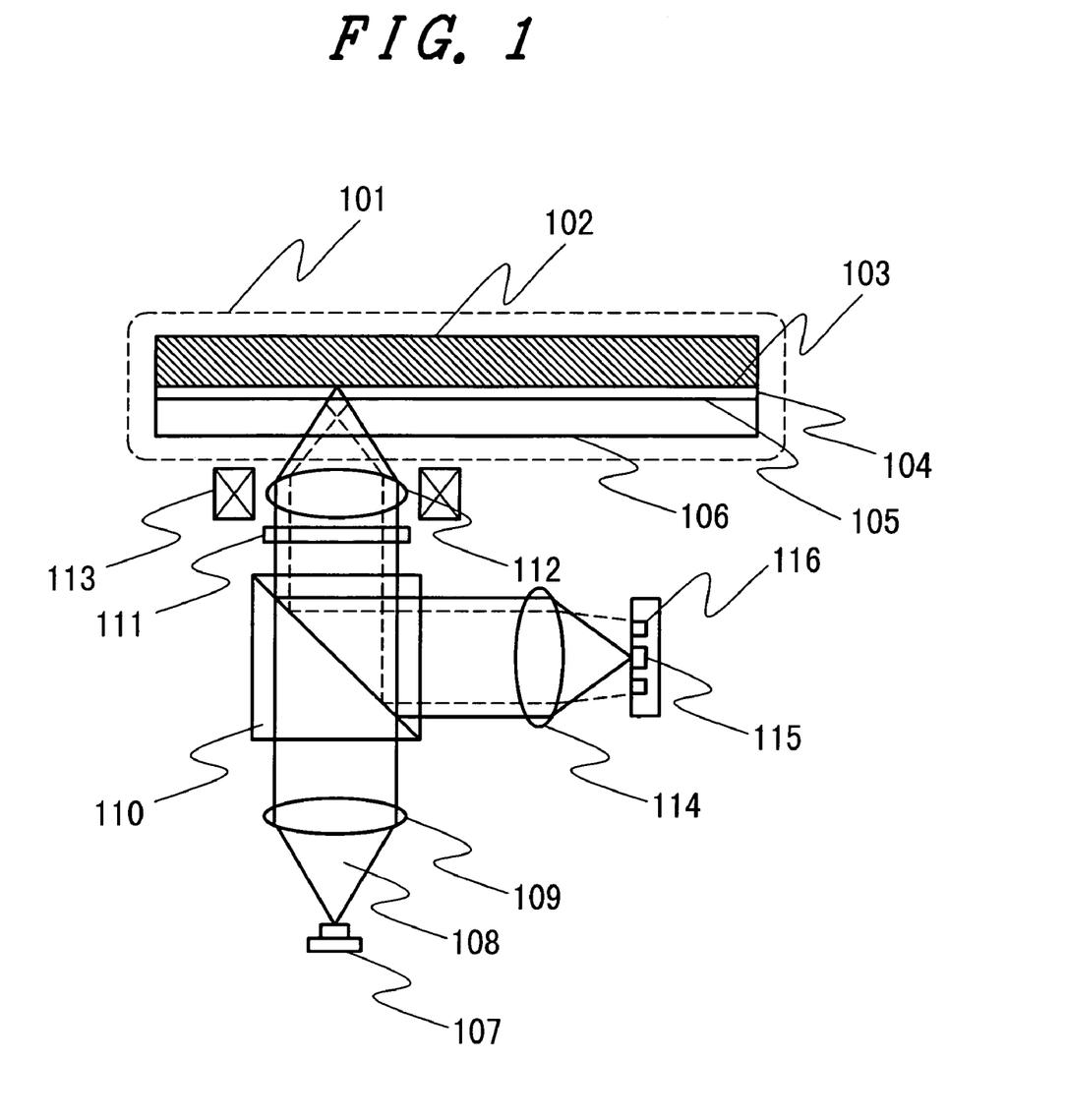
FIG. 1 schematically shows the basic configuration of an information recording apparatus according to the invention.

FIG. 1 schematically shows the basic configuration of an information recording apparatus according to the invention. Linearly polarized laser light 108 emitted by a laser diode 107 is turned into a parallel beam by passing through a collimating lens 109. The parallel beam is incident on a polarized beam splitter 110, which is an optical element that transmits linearly polarized light with a certain direction with substantially no loss and reflects, with substantially no loss, linearly polarized light with a polarized direction shifted by 90° with respect to the aforementioned linearly polarized light. In the present embodiment, the polarized beam splitter 110 is adapted to transmit linearly polarized light with the polarized direction of the laser light emitted by the laser diode 107. The linearly polarized laser light that passed through the polarized beam splitter 110 is turned into circularly polarized light by passing through a ¼-wavelength plate 111. This laser light is focused by an objective lens 112, whose position is controlled by an actuator 113, on an L0 Layer 103 and reflected thereby. Simultaneously, part of the laser light is reflected by the L1 layer 105. While the laser light reflected by the L0 Layer 103 and L1 layer 105 is turned back into linearly polarized light by passing through the ¼ wavelength plate 111 once again, its polarized direction is shifted from the original laser light emitted by the laser diode 107 by 90°. As a result, the reflected laser light is reflected by the polarized beam splitter 110 and propagates in a perpendicular direction. The laser light with the varied direction of propagation is then focused by a focusing lens 114 on the plane of a photodetector. Specifically, the laser light reflected by the L0 Layer 103 is focused on a first photodetector 115.

Parameters including the laser wavelength λ of the laser diode 107, numerical aperture $NA_0$ of the objective lens 112, numerical aperture $NA_1$ of the focusing lens 114, index of refraction n of the cover layer 106, and the thickness d of the spacer layer 104 are as follows.

λ=405 nm
$NA_0$=0.85
$NA_1$=0.1
n=1.6
d=25 μm

As the laser light is focused on the L0 Layer 103 located farther from the side on which the laser light is incident, a small optical spot 301 (see FIG. 3) of a diameter of approximately 400 nm is formed on the L0 Layer. Simultaneously, another optical spot 302 (see FIG. 3) is formed on the L1 layer 105 located closer to the side on which the light is incident. The diameter of the optical spot 302 is geometric-optically calculated by a following expression (1) to be approximately 31 μm in the present example, which corresponds to a width equivalent to about 100 tracks, assuming that the track pitch is 0.32 μm.

$$2d \tan\left(\sin^{-1}\left(\frac{NA_0}{n}\right)\right) \quad (1)$$

Figure 5:
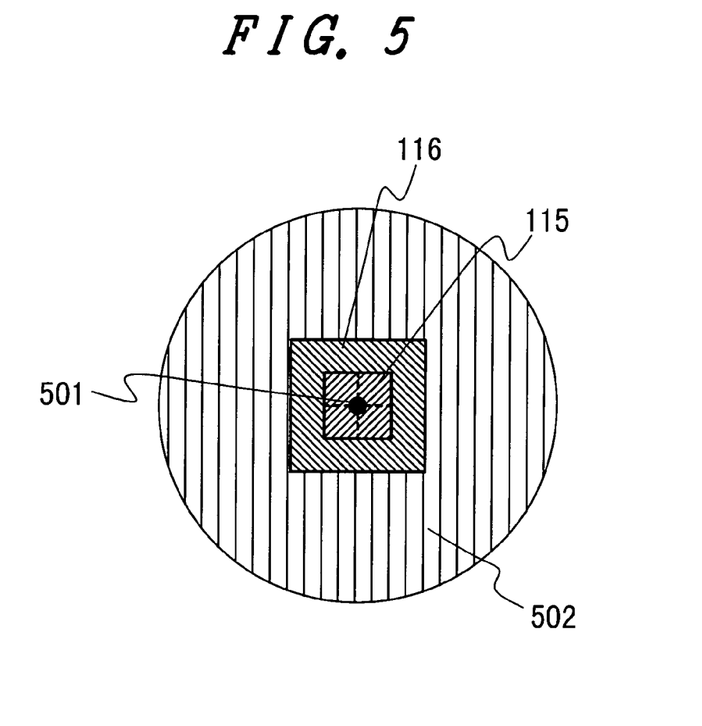
FIG. 5 schematically shows the arrangement of photodetectors and an optical spot on the photodetectors when the light is focused on the L0 Layer, in accordance with the invention.

Hereafter an optical spot on the plane of the photodetector 115 will be considered. FIG. 5 schematically shows the arrangement of the photodetector and an optical spot formed on the photodetector plane when the laser light is focused on the L0 Layer. When the laser light is focused on the L0 Layer 103, the laser light reflected by the L0 Layer 103 is focused on the plane of the first photodetector 115 as an optical spot 501, as shown in FIG. 5. However, the laser light reflected by the L1 layer 105 is not focused on the photodetector plane but creates an enlarged optical spot thereon. The diameter of this enlarged optical spot can be geometric-optically calculated by a following expression (2) which gives, for the present embodiment, a diameter of about 450 μm.

$$\frac{4d}{n} \cdot \left(\frac{NA_0}{NA_1}\right)^2 \cdot \tan(\sin^{-1}(NA_1)) \quad (2)$$

Normally, the first photodetector 115 measures several tens of micrometers per side. Thus, the optical spot 502 formed on the plane of the photodetector by the laser light reflected by the L1 layer 105 greatly extends beyond the boundary of the first photodetector 115, as shown in FIG. 5. This phenomenon is taken advantage of by the present invention whereby a second photodetector 116 is disposed outside the periphery of the first photodetector 115 separately from the first photodetector 115 in order to obtain a data read signal and a servo signal.

When the laser light is focused on the L0 Layer 103, the laser light reflected by the L0 Layer 103 is incident on the first photodetector 115. On the other hand, the laser light reflected by the L1 layer 105 is not focused but instead forms a large optical spot on the detector plane, thus being incident on both the first and second photodetectors 115 and 116. Because the second photodetector 116 only receives the reflected light from the L1 layer 105, its output signal only indicates the refraction index of the L1 layer 105. Thus, even when the laser light is focused on the L0 Layer 103, the reflected light from the L1 layer 105 can be detected separately from the reflected light from the L0 Layer 103 by using the second photodetector 116, so that the recording state of the L1 layer 105 can be learned with high accuracy.

Figure 12:
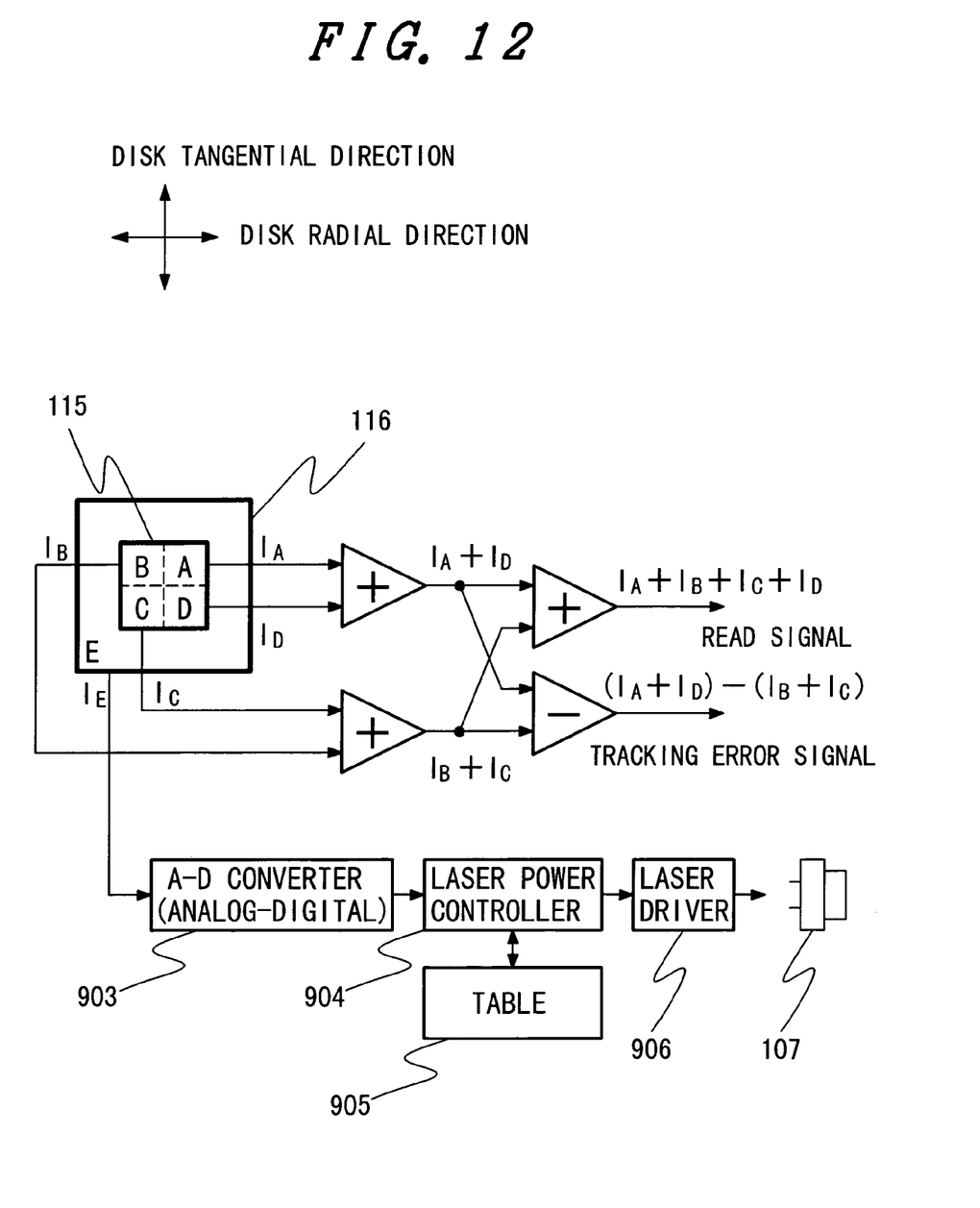
FIG. 12 shows a circuit block diagram for an example of a write power control method.

The first photodetector 115 has a structure as shown in FIG. 12, where the photodetector is divided in two in the radial direction and tangential direction of the disc, into a total of four sections. The individual photodetectors A, B, C and D in the four sections produce output signals $I_A$, $I_B$, $I_C$ and $I_D$, respectively, based on which $(I_A+I_B+I_C$ and $I_D)$ and $\{(I_A+I_D)-\{(I_B+I_C)\}$ are calculated, the former being used as a read RF signal and the latter as a tracking error signal.

the laser power delivered to the L0 layer 103 is influenced by the effective transmittance of the L1 layer 105. In the present invention, this is substituted by detecting an effective reflectance. As mentioned above, the difference in transmittance between unrecorded and recorded regions is in the range from several to 10%. On the other hand, the reflectance varies by as much as several dozen percentages. Thus, the recording state of the L1 layer 105 can be accurately detected by detecting variations in transmittance indirectly based on variations in reflectance in accordance with the invention. In this case, there is no limitations as to the data pattern recorded in the recorded region. This is due to the fact that in optical discs with mark-edge recording, a DSV (Digital Sum Value) control is effected based on a run length limited code and therefore the average mark length and average space length are substantially equal regardless of the recorded data pattern. Thus, the ratio of the recorded portions (mark portions) in the optical spot on the L1 layer is independent of the recorded data pattern.

In accordance with the recording method of the invention, the effective reflectance of the L1 layer 105 is directly detected in order to determine the write power directed to the L0 Layer 103, and therefore the recording state of the L0 layer 103 is irrelevant. Thus, there is no need for the L0 Layer 103 to be recorded in advance, as in Patent Document 2. Furthermore, the recording state of the L1 layer 105 can be determined even during the recording in the L0 Layer 103, so that the write power can be corrected on a real-time basis.

Figure 6:
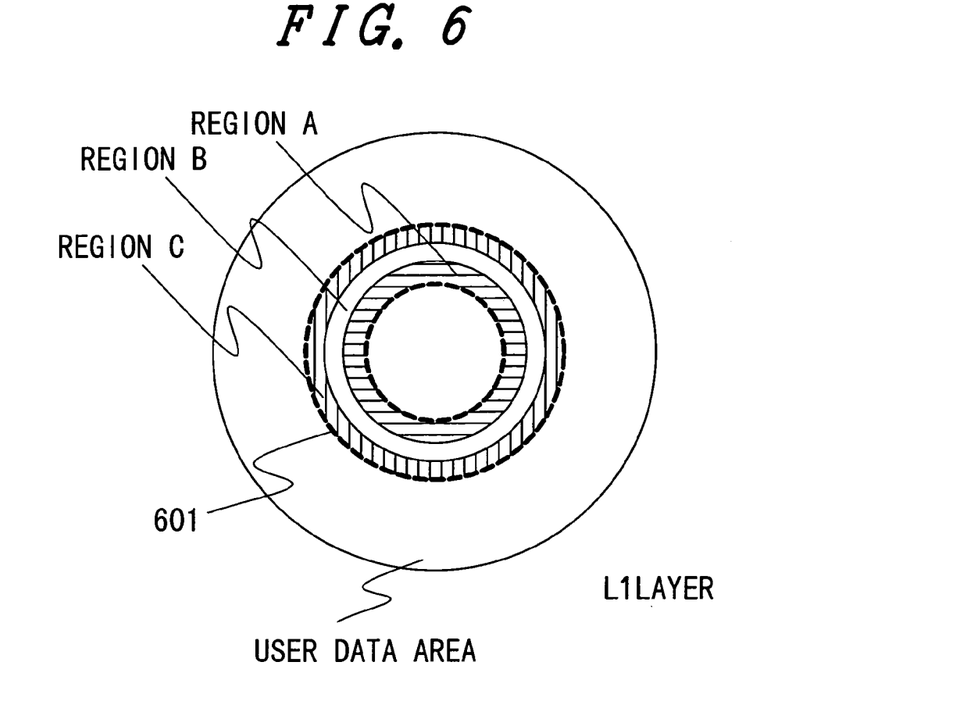
FIG. 6 shows an example of write learning regions.

Hereafter, the method of write learning will be described. As shown in FIG. 6, the whole or a part of a write learning region 601 enclosed by a dashed line is divided into three regions A, B and C. The purpose of each region is as follows:

Region A: A region for determining an optimum write power for L1 layer.

Region B: A region for determining an optimum write power for L0 Layer when the entire region within an optical spot on L1 layer is unrecorded.

Region C: A region for determining an optimum write power for L0 Layer when the entire region within an optical spot on L1 layer is recorded.

Each of Regions A, B and C must have a sufficient width in the radial and tangential directions of the disc so that the entirety of the optical spot on the L1 layer can be included. While in the example shown in FIG. 6, the write learning region is divided into three ring-shaped regions, the manner of division is not particularly limited. Therefore, the region may be divided in three in the tangential direction of the disc, for example.

Figure 7:
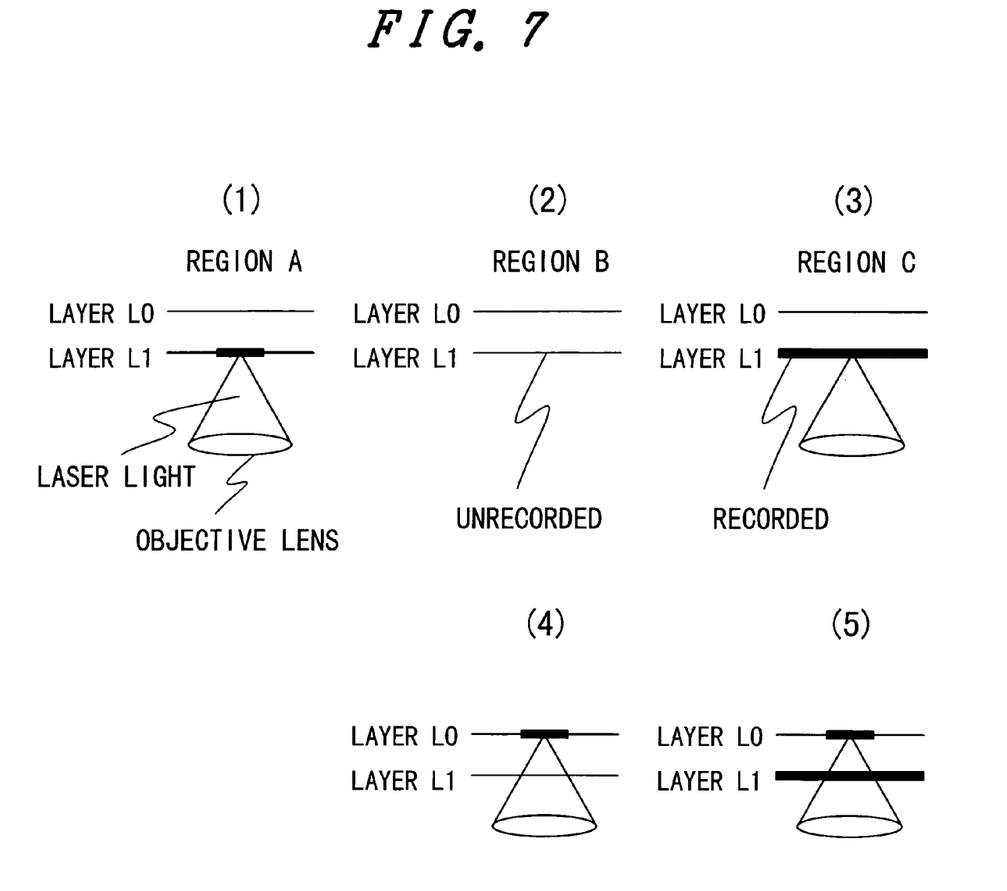
FIG. 7 illustrates the steps in a write learning process.

FIG. 7 shows the steps of write learning according to the present invention, showing a double-layer optical disc medium in a cross-sectional direction of the recording layers. The write learning process is conducted in accordance with the following steps (1) to (5) using the write learning region 601 shown in FIG. 6.

(1) In region A, recording is carried out by changing the write power with the laser light being focused on the L1 layer, in order to determine an optimum write power $P_{L1}$ for the L1 layer.

(2) Region B is left unrecorded and used as the region for determining the optimum write power for the L0 Layer for the case where the entire region within the optical spot on the L1 layer is unrecorded.

(3) The entirety of region C is recorded with the optimum write power $P_{L1}$ for the L1 layer determined in (1) in order to create a region for determining the optimum write power for the L0 Layer for the case where the entire region within the optical spot on the L1 layer is recorded.

(4) An output level $I_{L0,\ unrec}$ of the second photodetector 116 in region B and an optimum write power $P_{L0,\ unrec}$ are measured when the laser light is focused on the L0 Layer.

(5) An output level $I_{L0,\ rec}$ of the second photodetector 116 in region C and an optimum write power $P_{L0,\ rec}$ are measured when the laser light is focused on the L0 Layer.

In (3), the data pattern recorded is not particularly limited. In (1), (4) and (5), the optimum write power $P_{L1}$, $P_{L0,\ unrec}$ and $P_{L0,\ rec}$ are determined by any one of the following three methods.

(i) Method Whereby Jitter is Measured

Figure 8:
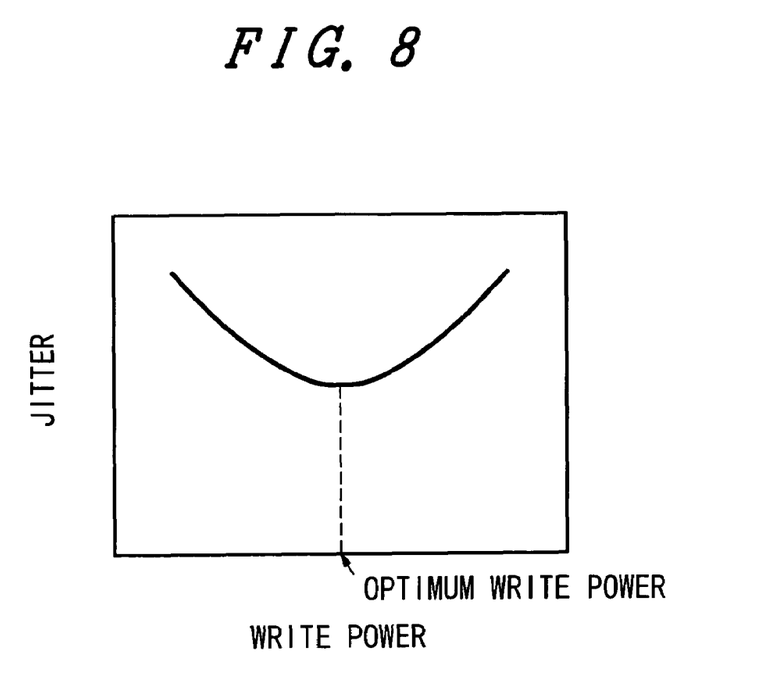
FIG. 8 schematically shows the relationship between write power and jitter.

In this method, recording is carried out while varying the write power and the jitter is measured. A jitter is the standard deviation in time difference between a binary read signal and a clock signal generated by PLL (Phase Locked Loop) using the read signal which has been normalized by a data detection window width (clock cycle in the present embodiment). As the data is read in synchronism with the clock generated by PLL, it is preferable to record in such a manner as to minimize the jitter if the recorded data is to be read without error. FIG. 8 schematically shows the relationship between the write power and jitter. The optimum write power refers to that write power at which jitter can be minimized.

(ii) Method Whereby Asymmetry is Measured

Figure 9:
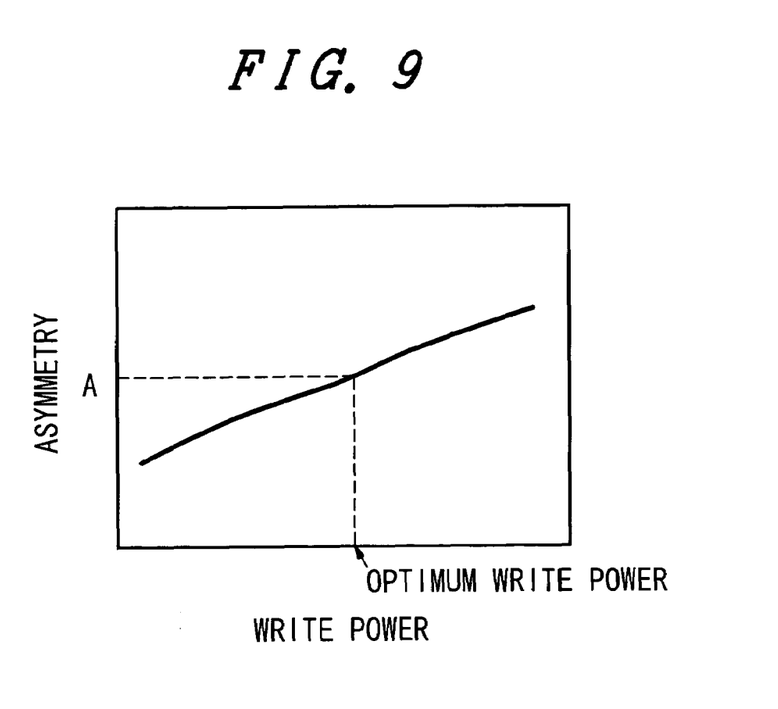
FIG. 9 schematically shows the relationship between write power and asymmetry.

In this method, recording is carried out while varying the write power and asymmetry is measured. Asymmetry is defined as follows:

$$(\text{Asymmetry})=(((I_{2H}+I_{2L})-(I_{8H}+I_{8L}))/2)/(I_{8H}-I_{8L})$$

where:

$I_{2H}$=Read signal level of a minimum space
$I_{2L}$=Read signal level of a minimum mark
$I_{8H}$=Read signal level of a maximum space
$I_{8L}$=Read signal level of a maximum mark FIG. 9 schematically shows the relationship between the write power and asymmetry. The optimum write power is that write power at which asymmetry is equal to a predetermined value A.

(iii) Method Whereby Modulation is Measured

In this method, recording is carried out while varying the write power and modulation is measured. Modulation herein is defined as follows:

$$(\text{Modulation})=(I_{8H}-I_{8L})/I_{8H}$$

where:

$I_{8H}$=Read signal level of 8T space
$I_{8L}$=Read signal level of 8T mark

Figure 10:
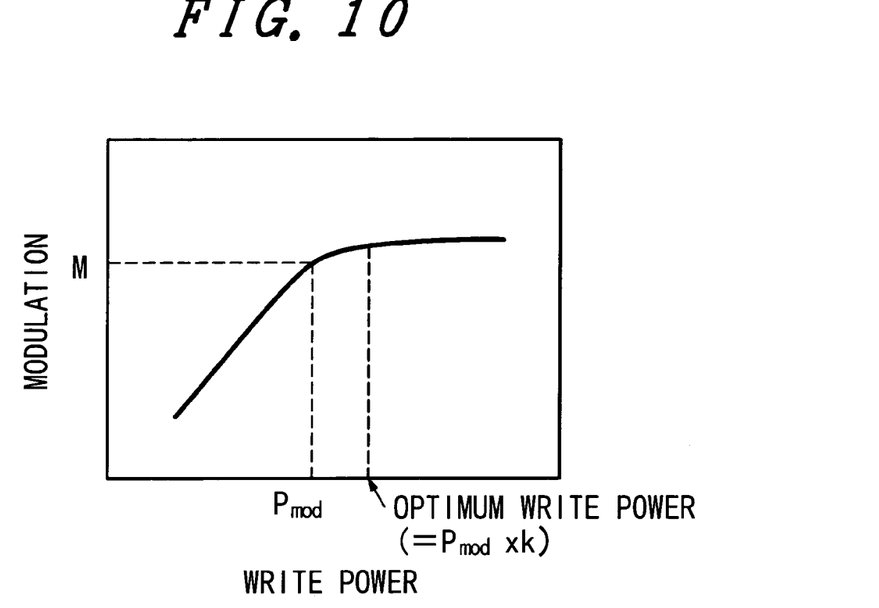
FIG. 10 schematically shows the relationship between write power and modulation.

FIG. 10 schematically shows the relationship between the write power and modulation. When the write power at which modulation is equal to a predetermined value M is $P_{mod}$, the optimum write power is obtained by multiplying $P_{mod}$ with a constant k.

When the steps (1) to (5) are completed and recording is carried out in a user data region, the write power $P_{L1}$ is used for recording in the L1 layer. Hereafter, the control of the write power when recording in the L0 Layer will be described with reference to three control methods.

(Control Method 1)

Figure 11:
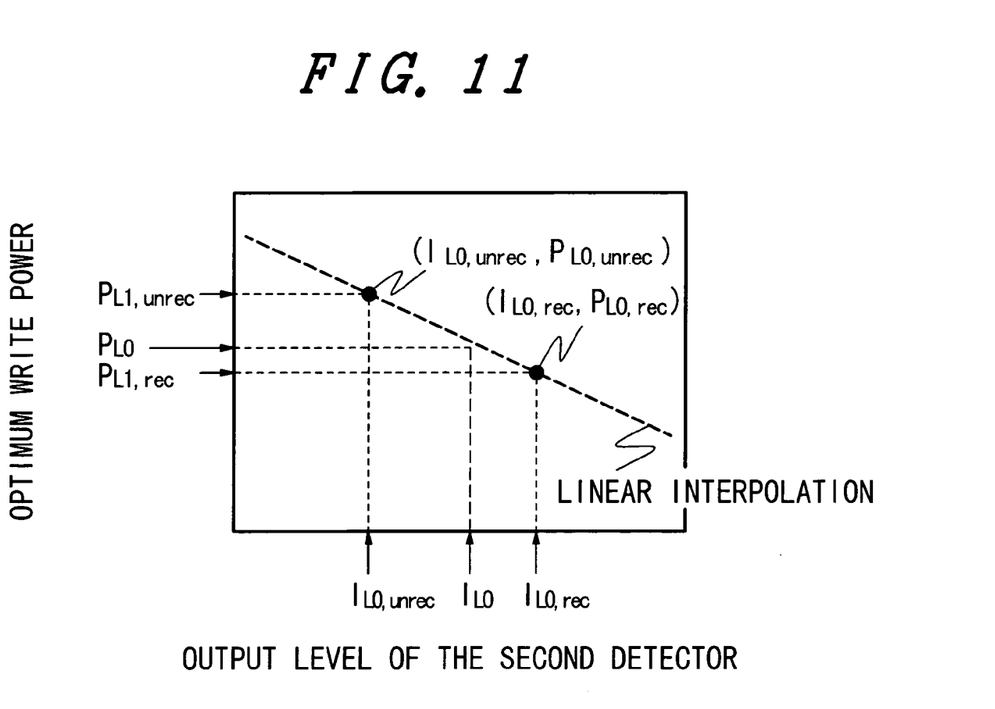
FIG. 11 shows the relationship between the output of the second photodetector and optimum write power.

An optimum write power $P_{L0}$ at a given position on the L0 Layer is given by a following expression (3) (see FIG. 11), which provides a linear interpolation of the output levels of the second photodetector and optimum write power in (4) and (5) when the output level of the second photodetector at the given position is $I_{L0}$. Thus, when the output level of the second photodetector is $I_{L0}$, the write power $P_{L0}$ for the L0 Layer is set such that the expression (3) is satisfied.

$$P_{L0} = \frac{P_{L0,unrec} - P_{L0,rec}}{I_{L0,unrec} - I_{L0,rec}} \cdot I_{L0} - \frac{P_{L0,unrec}I_{L0,rec} - P_{L0,rec}I_{L0,unrec}}{I_{L0,unrec} - I_{L0,rec}} \quad (3)$$

Figure 13:
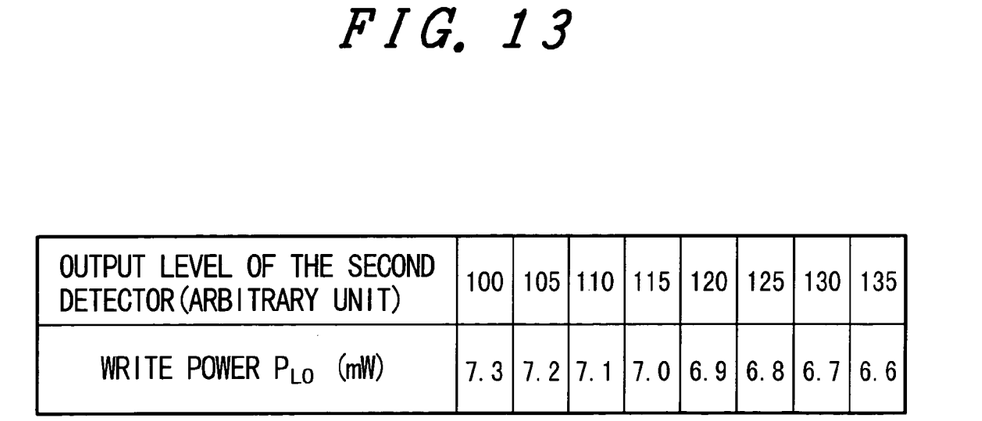
FIG. 13 shows an example of a table in which the relationship between the output level of the second photodetector and write power is stored.

The control method will be described in detail by referring to a circuit block diagram shown in FIG. 12. Using the output value of the second photodetector 116 and the optimum write power values $I_{L0, unrec}$, $P_{L0, unrec}$, $I_{L0, rec}$, and $P_{L0, rec}$ obtained by write learning, the optimum write power determined for various values of the output levels of the second photodetector in accordance with expression (3) is stored in advance in a table 905 in a format as shown in FIG. 13, for example.

When recording in the L0 Layer, the second photodetector 116 outputs a signal $I_E$ proportional to the power of the received laser light, at a position on the disc where the recording is to take place. Signal $I_E$ is converted into a digital signal by an analog-digital converter 903. A laser power controller 904 calculates a write power corresponding to the output of the second photodetector by referring to the table 905. A write power set value corresponding to the calculated optimum write power $P_{L0}$ is set in a laser driver 906, and the output power of the laser diode 107 is controlled by varying the current value supplied to the laser diode 107.

(Control Method 2)

A method whereby the write power for the L0 Layer is switched in two stages will be described. A write learning is conducted in accordance with the above-described steps (1) to (5), and a decision threshold $I_{thr}$ is calculated based on $I_{L0, unrec}$ and $I_{L0, rec}$ that are determined, in accordance with a following expression:

$$I_{thr} = (I_{L0, unrec} \text{ and } I_{L0, rec})/2$$

When recording in the L0 Layer, the output level of the second photodetector is measured at the position on the disc where the recording is to take place. If the output level is larger than the decision threshold $I_{thr}$, the write power is set at $P_{L0, unrec}$, and if it is smaller than the decision threshold, the write power is set at $P_{L0, rec}$.

Figure 14:
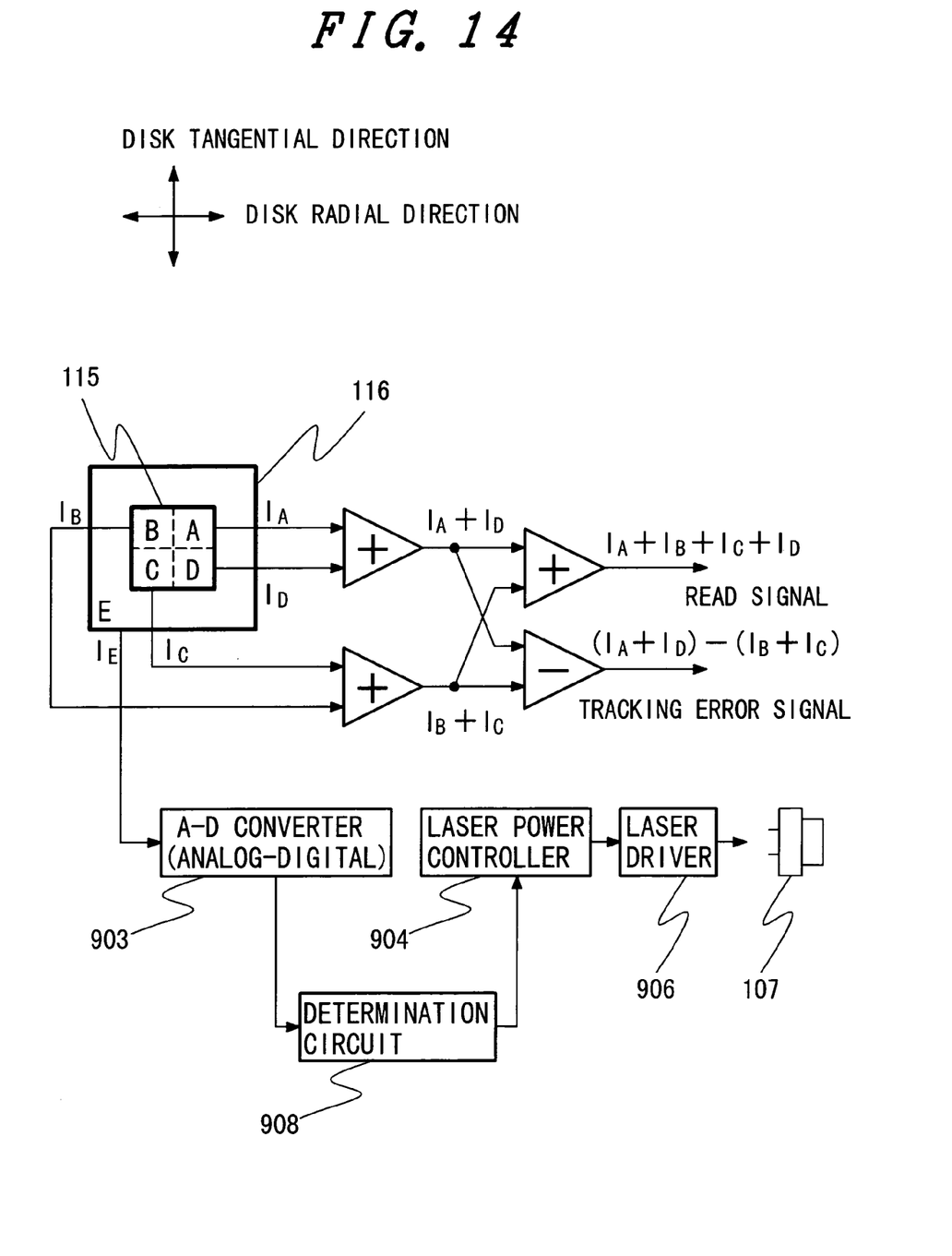
FIG. 14 shows a circuit block diagram of another example of a write power control method.

The control method will be described in more detail by referring to a circuit block diagram shown in FIG. 14. The second photodetector 116 outputs a signal $I_E$ proportional to the power of the received laser light. The signal $I_E$ is converted into a digital signal by an analog-digital converter 903. The magnitude of the signal is compared in a decision circuit 908 with that of decision threshold $I_{thr}$ that is determined in advance, and the decision result is sent to the laser power controller 904. The laser power controller 904 then switches the set value in laser driver 906 such that the write power is $P_{L0, unrec}$ or $P_{L0, rec}$ depending on whether the decision result is $I_E < I_{thr}$ or $I_E > I_{thr}$, respectively.

In this method, merely two kinds of write power are switched between when the L1 layer is unrecorded and when it is recorded. Thus, recording is not always performed with an optimum write power and the method is therefore inferior to control method 1 in terms of the quality of recorded marks. However, the method does not require a table such as that in control method 1 to be prepared and the structure of the laser power control circuit can be simplified, so that the manufacturing cost of the recording and reproduction apparatus can be reduced.

(Control Method 3)

In the above-described two methods, when recording in the L0 Layer, the write power is varied depending on the output of the second photodetector at a position on the disc where recording is to take place. In the method which will be described below, a constant write power $P_{L0}$ is used that is determined from the optimum write power values $P_{L0, unrec}$ and $P_{L0, rec}$, which are obtained by the write learning conducted in accordance with the above-described steps (1) to (5), in accordance with an expression (4) or (5):

$$P_{L0, unrec} < P_{L0} < P_{L0, rec} \quad (4)$$

$$P_{L0, unrec} > P_{L0} > P_{L0, rec} \quad (5)$$

For example, $$P_{L0} = (P_{L0, rec} + P_{L0, unrec})/2.$$

In this method, a constant write power is used for the L0 Layer, and the method is substantially equivalent to control method 2 in terms of the quality of recorded marks. However, control method 3 does not require a recording power control circuit, so that the apparatus structure can be simplified as compared with that for control method 2. Thus, the manufacturing cost for the recording and reproduction apparatus can be reduced.

What is claimed is:

1. An information recording apparatus comprising:
  a recording medium having two information recording layers stacked one upon the other in which information is recorded as their states are varied upon light irradiation;
  a light source;
  an optical system for focusing light from said light source selectively on a first information recording layer located closer to the side on which the light is incident and on a second information recording layer farther from the side on which the light is incident;
  a first photodetector for detecting light reflected by either said first or said second information recording layer on which the light from said light source is focused;
  a second photodetector for detecting light reflected by said first information recording layer when the light from said light source is focused on said second information recording layer; and
  a control circuit for controlling the power of the light with which said second information recording layer is irradiated, based on a detection signal from said second photodetector.

2. The information recording apparatus according to claim 1, further comprising a table in which a relationship between the detection signal from said second photodetector and the power of the light with which said second information recording layer is irradiated is stored.

3. The information recording apparatus according to claim 2, wherein said table stores a relationship between the power of the light with which said second information recording layer is irradiated and the detection signal from said second photodetector when said first information recording layer is recorded, and a relationship between the power of the light with which said second information recording layer is irradiated and the detection signal from said second photodetector when said first information recording layer is not recorded.

4. The information recording apparatus according to claim 1, further comprising a decision circuit for determining whether or not the output of said second photodetector exceeds a predetermined threshold, wherein said control circuit is adapted to switch the power of the light with which said second information recording layer is irradiated, in accordance with the result of determination by said decision circuit.

5. The information recording apparatus according to claim 1, wherein said second photodetector is disposed outside the periphery of said first photodetector.

6. An information recording method for recording information in a recording medium having two information recording layers stacked one upon the other in which information is recorded as their states are varied upon light irradiation, said method comprising the steps of:

acquiring, in a test writing operation, a first optimum power value for recording, through a recorded region in a first information recording layer located closer to the side on which light is incident, in a second information recording layer located farther from the side on which light is incident, and the intensity of a first reflected light from said first information recording layer at that time, and a second optimum power value for recording, through an unrecorded region in said first information recording layer located closer to the side on which light is incident, in said second information recording layer located farther from the side on which light is incident, and the intensity of a second reflected light from said first information recording layer at that time;

detecting the intensity of reflected light from said first information recording layer when light is focused on said second information recording layer; and controlling the power of the light with which said second information recording layer is irradiated, based on the detected signal.

7. The information recording method according to claim 6, wherein the power of the light with which said second information recording layer is irradiated is equal to a power value obtained by linearly interpolating said first optimum power value for said first reflected light intensity and said second optimum power value for said second reflected light intensity with the intensity of the reflected light that has been detected.

8. The information recording method according to claim 6, further comprising the step of calculating a decision threshold from said first reflected light intensity and said second reflected light intensity, wherein the power of the light with which said second information recording layer is irradiated is switched depending on whether or not the detection signal exceeds said decision threshold.

9. The information recording method according to claim 6, wherein said first optimum power value and said second optimum power value are determined by measuring a jitter.

10. The information recording method according to claim 6, wherein said first optimum power value and said second optimum power value are determined by measuring asymmetry.

11. The information recording method according to claim 6, wherein said first optimum power value and said second optimum power value are determined by measuring modulation.

12. An information recording method for recording information in an information recording medium having two information recording layers stacked one upon the other in which information is recorded as their states are varied upon light irradiation, said method comprising the steps of:

acquiring, in a test writing operation, a first optimum power value $P_0$ for recording, through a recorded region in a first information recording layer located closer to the side on which light is incident, in a second information recording layer located farther from the side on which light is incident, and a second optimum power value $P_1$ for recording, through an unrecorded region on said first information recording layer, in said second information recording layer; and recording information by focusing light on said second information recording layer, using a write power P such that $P_0<P<P_1$ or $P_0>P>P_1$ is satisfied.

* * * * *